2,887,464
COMPOSITION COMPRISING COPOLYMERS OF METHYL METHACRYLATE AND α-METHYLSTYRENE WITH POLYMERS OF ACRYLIC ESTERS

Harry W. Coover, Jr., and Willis C. Wooten, Jr., Kingsport, Tenn., assignors to Eastman Kodak Company, Rochester, N.Y., a corporation of New Jersey No Drawing. Application November 15, 1954
Serial No. 469,022

4 Claims. (Cl. 260—45.5)

This invention relates to resinous compositions comprising mixtures of copolymers of methyl methacrylate and α-methylstyrene with a lesser proportion of an acrylic or methacrylic ester polymer or with a lesser proportion of a butadiene-1,3 polymer.

As is known in the art, copolymers of methyl methacrylate and α-methylstyrene can be made by usual polymerization procedures to give resins that have properties of hardness, heat stability, etc. which make them useful in the formation of shaped articles. However, they have certain disadvantages. For example, they have low extensibilities and flexibility, and have to be shaped at relatively high temperatures. These difficulties can in some cases be overcome by incorporation of liquid plasticizers such as dimethyl phthalate, diethyl phthalate, etc. However, when liquid plasticizers are employed, many undesirable effects are produced. For example, the high resistance of these resins to distortion under heated conditions are greatly decreased, and problems of plasticizer migration or disappearance by evaporation are encountered. It would be highly advantageous, therefore, to provide resinous copolymers of methyl methacrylate and α-methylstyrene which would retain all the good properties of this kind of resin such as hardness, toughness and high heat resistance, i.e. high heat distortion temperatures, and at the same time have improved extensibility and flexibility and better flow rates to permit shaping at relatively low temperatures. We have now found that such advantageous resinous compositions can be prepared by physically mixing in certain proportions a copolymer of methyl methacrylate and α-methylstyrene with certain polymers such as acrylic and methacrylic ester polymers or butadiene-1,3 polymers.

It is, accordingly, an object of the invention to provide new resinous compositions comprising certain mixtures of methyl methacrylate/α-methylstyrene copolymers with certain acrylic or methacrylic ester polymers or with certain butadiene-1,3 polymers. Another object is to provide resinous compositions suitable for shaping purposes which have relatively high flow rates at lower processing temperatures and which are capable of giving shaped objects that are relatively hard and tough and having relatively high heat distortion temperatures. Another object is to provide methods for preparing the said resinous compositions. Other objects will become apparent hereinafter.

In accordance with our invention, we prepare resinous compositions comprising physical mixtures of from 80 to 98% by weight of a binary copolymer of methyl methacrylate and α-methylstyrene containing from 55 to 90%, but preferably from 55 to 85% by weight methyl methacrylate and from 45 to 10%, but preferably from 45 to 15%, by weight of α-methylstyrene, and from 20 to 2% by weight of a polymer from the group consisting of a homopolymer of an acrylic ester represented by the general formula:

$$CH_2=C(R)-C(=O)-OR_1$$

wherein R represents an atom of hydrogen or a methyl group and $R_1$ represents an alkyl group containing from 1 to 12 carbon atoms, a binary copolymer of said ester containing at least 60%, but preferably 60 to 95% by weight of the said acrylic ester, and the remainder of a different monoethylenically unsaturated polymerizable compound or a copolymer of butadiene-1,3 containing from 50 to 90% but preferably from 60 to 80%, by weight of butadiene-1,3, and the remainder of a different monoethylenically unsaturated, polymerizable compound. The preferred compositions of the invention comprise from 80 to 98% by weight of a binary copolymer of from 55 to 95% by weight of methyl methacrylate and 45 to 5% by weight of α-methylstyrene, and from 20 to 2% by weight of a polyalkyl acrylate or polyalkyl methacrylate, such preferred compositions having especially operable flow rates, and the shaped articles prepared therefrom exhibiting particularly good extensibility and flexibility and relatively higher heat distortion temperatures.

The above defined mixtures can be prepared by any of several methods. For example, the polymeric components can be dissolved in one or more common solvents. In this procedure, the components can be mixed together before addition to the solvent or they can be dissolved separately in the solvent and their separate solutions then mixed together, the mixture in either case being precipitated into a nonsolvent therefor. They can also be polymerized separately to aqueous emulsion form, the emulsions then mixed together and coagulated by means of a saturated sodium chloride solution, followed by filtering, washing and drying the coagulated mixed polymer product. They can also be prepared by mixing the polymeric components on hot rolls and the mixture obtained then being granulated to the desired size.

Mixtures outside the above defined limits of the invention are not satisfactory for preparing superior shaped articles. We have found, for example, that in the case of the copolymers of methyl methacrylate and α-methylstyrene, if the α-methylstyrene content is less than 10% by weight of the copolymer, high heat resistant polymers are not obtained. If the α-methylstyrene content is above 45%, the polymer is difficult to prepare having extremely low conversion and the heat distortion temperature thereof is too low to measure. The following Table I shows the relationship between proportions of α-methylstyrene in the copolymer and heat distortion temperature and percent conversion of the monomers to the copolymers.

TABLE I

| Composition of the copolymer | | Conversion, percent | Heat Distortion Temperature of Copolymer, °C. |
|---|---|---|---|
| Methyl Methacrylate, percent by weight | α-Methylstyrene, percent by weight | | |
| 100 | 0 | 95 | 115 |
| 90 | 10 | 90 | 122 |
| 80 | 20 | 96 | 132 |
| 70 | 30 | 96 | 133 |
| 60 | 40 | 88 | 133 |
| 40 | 60 | 10 | (¹) |

¹ Not enough to measure.

We have found further that the amount of polymer (acrylic or butadiene polymers as defined) is also critical. If an amount exceeding 20%, based on the total weight of the mixture of methyl methacrylate/α-methylstyrene copolymer and the specified polymer, is employed the shaped articles produced from such mixtures are soft and weak in character. They are not useful for the purpose of the invention of forming rigid, heat stable articles, The following Table II shows the relationship between proportions in the mixture and rate of flow, heat distortion temperature, flexure strength and hardness. This relationship is illustrated with varying proportions of an 80:20 methyl methacrylate/α-methylstyrene copolymer (80 MMA and 20 α-MS) and polyethyl acrylate.

TABLE II

| Mixture of Polymers | | Rate of Flow, Grams/Minute | Heat Distortion Temp., °C. | Flexure Strength, p.s.i. | Hardness |
|---|---|---|---|---|---|
| Copolymer 80 MMA and 20 α-MS | Polyethyl Acrylate | | | | |
| 100 | 0 | 0.025 | 130 | 17,000 | 5H–6H |
| 95 | 5 | 0.061 | | 16,300 | 5H–6H |
| 90 | 10 | 0.345 | | 16,300 | 5H–6H |
| 80 | 20 | 0.525 | 123 | 10,500 | 2H–3H |
| 70 | 30 | | | 6,000 | B–HB |

The hardness of the samples was determined as "scratch hardness." This involves scratching the samples with pencils of various hardness grades (7H, 6H, 5H, 4H, 3H, 2H, H, F, 4B, B, 2B, 3B, 4B, 5B are the grades used, where 7H is the hardest and 5B is the softest). When a sample is rated as 5H–6H it means that a 6H pencil would scratch the sample, while a 5H pencil would not.

As can be seen from the above table, the flow rate increases rapidly with incorporation of polyethyl acrylate without much loss in heat distortion temperature, but above 20% of polyethyl acrylate the flexure strength and hardness decrease sharply. Others of our preferred mixtures show similar characteristics as set forth for the materials in the above Tables I and II.

Suitable monoethylenically unsaturated, polymerizable compounds which can be employed to prepare the mentioned binary copolymers with the acrylic esters include acrylonitrile, methacrylonitrile, a vinyl halide such as vinyl chloride, vinyl fluoride, etc., or a vinylidene halide such vinylidene chloride, vinylidene fluoride, etc. Suitable monoethylenically unsaturated, polymerizable compounds which can be employed to prepare the mentioned binary copolymers of butadiene-1,3 include a vinyl aromatic hydrocarbon such as styrene, α-methylstyrene, vinyl naphthalene, etc., acrylonitrile, methacrylonitrile, an alkyl acrylate or methacrylate wherein the alkyl group contains from 1 to 12 carbon atoms such as methyl acrylate, ethyl acrylate, butyl acrylate, lauryl acrylate, methyl methacrylate, n-butyl methacrylate, etc., a vinyl halide such as vinyl chloride, vinyl fluoride, etc., or a vinylidene halide such as vinylidene chloride, vinylidene chloride-bromide, etc.

The following examples will serve further to illustrate the new resinous compositions of our invention and the manner of their preparation.

*Example 1*

In a 3-necked flask equipped with a stirrer, a thermometer and a nitrogen induction tube, there were placed 200 g. of α-methylstyrene, 1800 g. of methyl methacrylate, 10,000 cc. of distilled water, 60 g. of sodium lauryl sulfate, 10 g. of potassium persulfate and 5 g. of tertiary dodecyl mercaptan. The mixture was stirred under a slight pressure of nitrogen for a period of 48 hours at 50° C. The emulsion of polymer obtained was treated with a saturated aqueous sodium chloride solution to isolate the polymer which was then washed with water and dried at 50° C. for a period of 48 hours. Analysis indicated that the polymer product was a copolymer consisting of approximately 80% by weight of methyl methacrylate and 20% by weight of α-methylstyrene.

*Example 2*

In a 12-oz. bottle, there were placed 15 g. of styrene, 90 cc. of water, 1.8 g. of sodium laurate, 0.2 g. of potassium persulfate and 0.2 g. of tertiary dodecyl mercaptan. The bottle was cooled to −15° C. and 35 g. of butadiene-1,3 was added to the mixture contained therein. The bottle was then sealed with a crown cap and tumbled at 50° C. for 24 hours. The polymer was isolated from its emulsion by breaking the emulsion with a saturated aqueous sodium chloride solution, after which it was filtered off, washed with water and dried in a vacuum desiccator for 48 hours at room temperature. The polymer product was a copolymer consisting of approximately 70% by weight of butadiene-1,3 and 30% by weight of styrene.

*Example 3*

A mixture of 40 g. of ethyl acrylate, 240 g. of water, 1.2 g. of sodium lauryl sulfate, 0.2 g. of potassium persulfate and 0.05 g. of tertiary dodecyl mercaptan were treated by the procedure described in Example 2. The polymer product obtained was polyethyl acrylate.

In place of the ethyl acrylate in the above example, there can be substituted a like amount of other mentioned alkyl acrylates or methacrylates to give polymers such as polymethyl acrylate, poly-n-butyl acrylate, poly-n-lauryl acrylate, polymethyl methacrylate, etc.

*Example 4*

An aqueous emulsion containing 80 g. of a copolymer of 80% by weight of methyl methacrylate and 20% by weight of α-methylstyrene, prepared as in Example 1, and an aqueous emulsion containing 20 g. of a copolymer of 70% by weight of butadiene-1,3 and 30% by weight of styrene, prepared as in Example 2, were thoroughly mixed together and the polymers isolated in intimate admixture with one another by the addition of a saturated aqueous sodium chloride solution to the emulsion mixture. The mixture of polymers was filtered off, washed with water and dried. It consisted of a mixture of 80 parts by weight of the methyl methacrylate copolymer and 20 parts by weight of the butadiene copolymer and was readily moldable at 200° C. into heat resistant shaped articles.

*Example 5*

An aqueous emulsion containing 80 g. of a copolymer of 80% by weight of methyl methacrylate and 20% of α-methylstyrene was mixed with an aqueous emulsion containing 20 g. of polyethyl acrylate. The mixed polymer was isolated in the usual manner by breaking the emulsion with a saturated aqueous sodium chloride solution, followed by separating, washing and drying the polymer. The mixed polymer consisted of 80 parts by weight of the methyl methacrylate copolymer and 20 parts by weight of polyethyl acrylate. It was readily injection molded at 200° C. to yield hard, tough specimens that had a heat distortion temperature of 132° C. and a flexure strength of 16,000 p.s.i.

In place of the polyethyl acrylate in the above example, there can be substituted a like amount of any of the other mentioned acrylates or methacrylates, for example, polymethyl acrylate, poly-n-propyl acrylate, polyisopropyl acrylate, polyisobutyl acrylate, poly-n-lauryl acrylate, polymethyl methacrylate, polyethyl methacrylate, etc. to give mixtures and molded speciments having generally similar properties.

*Example 6*

An aqueous emulsion containing 90 g. of a copolymer of 60% by weight of methyl methacrylate and 40% by weight α-methylstyrene was mixed with an aqueous emulsion containing 10 g. of poly-n-butyl acrylate. The mixed polymer was processed as in Example 5. It consisted in admixture of 90 parts by weight of the methyl methacrylate copolymer and 10 parts by weight of poly-n-butyl acrylate. On molding at 200° C., the mixed polymer gave specimens having generally properties to those of Example 5.

*Example 7*

An aqueous emulsion containing 90 g. of a copolymer of 60% by weight methyl methacrylate and 40% by weight of α-methylstyrene was mixed with an aqueous emulsion containing 10 g. of a copolymer of 70% by weight of butadiene-1,3 and 30% by weight of α-methylstyrene. The mixed polymer was processed as in Example 5. It consisted in admixture of 90 parts by weight of the methyl methacrylate copolymer and 10 parts by weight of the butadiene-1,3 copolymer. The mixed polymer was readily compression molded at 150° C. to yield buttons that were hard and tough and which had a heat distortion temperature of 130° C.

*Example 8*

80 g. of a copolymer of 70% by weight of methyl methacrylate and 30% by weight of α-methylstyrene was mixed on a hot roll with 20 g. of a copolymer of 70% by weight of n-butyl acrylate and 30% by weight of methacrylonitrile. The rolled material was granulated and injection molded at 200° C. The specimens obtained were hard and tough and temperature-resistant.

Any other physical mixtures coming within the specified ranges of the invention can be prepared by following the procedures set forth in the preceding examples. Thus, the preferred mixtures may contain 80%, 85%, 90%, 95%, 98%, etc. by weight of the specified methyl methacrylate/α-methylstyrene copolymer, the remainder of the mixture in each case being preferably a polyacrylate such as polyethyl acrylate, a polybutyl acrylate, etc. or a corresponding polymethylacrylate. These mixtures, as well as those prepared with any of the mentioned copolymers that can be admixed with the methyl methacrylate/α-methylstyrene copolymers, all have flow rates and the articles produced therefrom are characterized by being hard and tough and having high flexure strength and high heat distortion temperatures.

Although the mixed compositions of the invention have been specifically described in connection with their use for molding of three dimensional objects and articles, these compositions are also adaptable to the preparation of sheet materials which may or may not contain, as desired, suitable fillers, plasticizers, dyes, and the like added materials. For sheet making purposes, the mixed compositions can be coated from their solutions in suitable organic solvents onto smooth surfaces, metal, glass, etc., or extruded from their hot melts. Such sheet materials are characterized by dimensional stability due to their relatively high heat distortion temperatures and are eminently suitable for use as photographic film supports.

What we claim is:

1. A resinous composition comprising a mixture of from 80 to 98% by weight of a copolymer of from 55 to 85% by weight of methyl methacrylate and from 45 to 15% by weight of α-methylstyrene, and from 20 to 2% by weight of polyethyl acrylate.

2. A resinous composition comprising a mixture of from 80 to 98% by weight of a copolymer of from 55 to 85% by weight of methyl methacrylate and from 45 to 15% by weight of α-methylstyrene, and from 20 to 2% by weight of poly-n-butyl acrylate.

3. A resinous composition comprising a mixture of from 80 to 98% by weight of a copolymer of from 55 to 90% by weight of methyl methacrylate and from 45 to 10% by weight of α-methylstyrene, and from 20 to 2% by weight of a homopolymer of an acrylate compound represented by the following general formula:

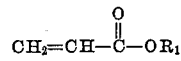

wherein $R_1$ represents an alkyl group of from 1 to 12 carbon atoms.

4. A resinous composition comprising a mixture of 80 to 98% by weight of a copolymer of 80% by weight of methyl methacrylate and 20% by weight of α-methylstyrene, and from 20 to 2% by weight of polyethyl acrylate.

References Cited in the file of this patent

UNITED STATES PATENTS

| | | |
|---|---|---|
| 2,614,093 | Wheelock | Oct. 14, 1952 |
| 2,643,987 | Harrison et al. | June 30, 1953 |

FOREIGN PATENTS

| | | |
|---|---|---|
| 644,022 | Great Britain | Oct. 4, 1950 |